United States Patent [19]

Schwarzkopf

[11] 3,855,936

[45] Dec. 24, 1974

[54] MOTORIZED ROLLER-COASTER CAR

[75] Inventor: Anton Schwarzkopf, Munsterhausen/Schwaben, Germany

[73] Assignee: Firma Anton Schwarzkopf, Munsterhausen/Schwaben, Germany

[22] Filed: Mar. 29, 1972

[21] Appl. No.: 239,016

[30] Foreign Application Priority Data
Mar. 30, 1971 Germany............................ 2115394

[52] U.S. Cl...................... 104/63, 104/243, 105/30, 105/97, 105/98, 105/130, 105/133, 105/199 S, 105/453, 267/3, 272/32, 272/44

[51] Int. Cl........ A63g 7/00, B61c 9/52, B61c 11/00

[58] Field of Search............ 104/53, 63, 64, 65, 66, 104/67, 243; 105/29 R, 30, 32, 130, 199 S, 105/97, 98, 133, 453; 267/63 R, 3; 272/34, 44, 32

[56] References Cited
UNITED STATES PATENTS

| | | | |
|---|---|---|---|
| 572,111 | 12/1896 | Griffiths........................ | 105/29 R X |
| 577,550 | 2/1897 | Griffiths............................ | 104/63 |
| 1,020,276 | 3/1912 | Gambrel...................... | 105/199 S X |
| 1,663,690 | 3/1928 | Ellis................................. | 105/30 X |
| 2,081,261 | 5/1937 | Bartlett............................. | 104/63 |
| 2,851,282 | 9/1958 | Pogioli.......................... | 267/63 R X |
| 3,114,332 | 12/1963 | Bacon et al...................... | 104/63 |
| 3,540,380 | 11/1970 | Dashew et al. ................. | 105/30 X |
| 3,631,805 | 1/1972 | Schwarzkopf....................... | 104/63 |

FOREIGN PATENTS OR APPLICATIONS
1,126,885    9/1968    Great Britain..................... 104/243

Primary Examiner—M. Henson Wood, Jr.
Assistant Examiner—Howard Beltran
Attorney, Agent, or Firm—Karl F. Ross; Herbert Dubno

[57] ABSTRACT

A rail-borne vehicle for a roller coaster has a front axle and a rear axle each connected by a swivel joint with a respective bearing plate which is joined to the vehicle body through a set of shock absorbers carried at the end of a pair of transverse outrigger arms. The outrigger arms of the front bearing plate are pivotally secured thereto for swinging about a central longitudinal axis. Each axle consists of two wheel-bearing stubs rigid with a common axle housing on which a power shaft for a traction wheel is journaled in resiliently mounted bearings, the traction wheel being frictionally engageable with an ancillary track member located between the rails along uphill stretches of the vehicular path. A motor aboard the vehicle, energizable by bus bars extending alongside the ancillary track member, is connected with the traction wheels of both axle housings through universally jointed shafts and is coupled through a freewheel with a releasable brake preventing reverse rotation of the motor and backsliding of the vehicle on an upgrade. The power shaft is coupled with the traction wheel through an overrunning clutch enabling free coasting of the vehicle at high speeds.

16 Claims, 11 Drawing Figures

MOTORIZED ROLLER-COASTER CAR

My present invention relates to a rail-borne powered vehicle of the type used in amusement devices, particularly in roller coasters or scenic railways.

In such roller coasters it is customary to propel a vehicle or a train of such vehicles, e.g., with the aid of a tow chain, up a slope to the highest point of a track which may have a figure-8 configuration and frequently includes not only downgrades but also intervening upgrades of progressively decreasing height. The vehicle must follow the curvatures of the track which, in turn, has to be properly banked so that the front and rear axles are subjected to considerable stresses in different directions.

The general object of the present invention is to provide an improved mounting of the wheel axles of such a vehicle on the body thereof to facilitate accommodation of the position of the front and rear wheels to the changing track configuration for the purpose of safely guiding the vehicle, even at high speeds, and eliminating impacts (especially on sharp turns) which could damage the wheel base and cause discomfort to the passengers.

Another object is to provide means in such a vehicle or train for generating supplemental power, especially on the upgrade, so as to enable the climbing of steeper and/or higher uphill stretches to afford greater variety in the layout of the track.

In accordance with a feature of the present invention, I provide each of the two wheel axles with an individual bearing plate to which the axle is linked by a swivel mounting enabling same to rotate freely about a vertical axis with reference to the vehicle body, the bearing plate in turn being secured to that body through a damping unit which forms a yieldable coupling between the bearing plate and the body. The damping unit advantageously comprises a pair of shock absorbers carried on opposite ends of an outrigger arm which is transverse to the direction of vehicle motion, being thus substantially parallel to the associated axle, there being preferably two such arms secured to each bearing plate forwardly and rearwardly of the respective axles. In order to facilitate relative sluing of the two axles upon entering or leaving a banked track section, the outrigger arm or arms of at least one bearing plate (preferably the front one) may be pivotally mounted for swinging about a central longitudinal axis of the vehicle.

According to a more particular feature of my invention, the swivel mounting for each bearing plate comprises two coaxial rings rigid with the bearing plate and the associated axle, respectively, the two rings engaging each other for relative rotation through the intermediary of antifriction means such as a set of balls. Each wheel axle is divided into a pair of spaced-apart stubs which support the respective wheels and are interconnected at the top by the corresponding ring of the swivel mounting and at the bottom by an axle housing rigid therewith, this axle housing being advantageously of downwardly convex shape for greater structural strength. The splitting of the axle into two axially separated stubs provides space to accommodate a traction wheel passing through a cutout in the axle housing for frictional engagement with a track member paralleling the rails; such a track member may be disposed at least on certain uphill stretches between the rails together with a conductor or a pair of conductors engaged by contact brushes or the like to energize a drive motor aboard the vehicle which is linked with the traction wheel through a suitable transmission. A power shaft driven from the motor and supporting the traction wheel is journaled on the axle housing, preferably through resilient bearing means. If the drive motor is directly carried on the body of the vehicle, the transmission leading from this motor to the power shaft may include a universally jointed link or an equivalent flexible shaft. Such a flexible linkage enables the motor to drive two traction wheels supported on the bearing plates of the front and rear axles, respectively.

Since the vehicle so equipped generally arrives in a valley between two sloping track sections at considerable speed which is available to carry it at least partly over the adjoining upgrade, the energized drive motor should not exert a braking action through the traction wheel. For this purpose I prefer to couple the traction wheel with its power shaft through an over-running clutch enabling that wheel to turn faster than the shaft so as to let the vehicle coast freely, regardless of the state of energization of the motor.

On the other hand, the presence of rising slopes too large to be surmounted by the kinetic energy of a coasting vehicle creates the danger of a vehicle or train being stopped on the upgrade by a power failure and then backsliding to the foot of the rise. In order to eliminate this risk, I prefer to provide a releasable emergency brake on the wheel body and to connect same with the motor shaft through a unidirectional coupling or freewheel which may be functionally equivalent to the aforementioned over-running clutch. Such a brake not only prevents backsliding, but also avoids reverse rotation of the motor shaft which could overload and burn out the windings of the drive motor.

In a train of such vehicles, only one vehicle needs to be equipped with a drive motor inasmuch as the traction wheels of all the vehicles may be interconnected by flexible transmissions.

The above and other features of my invention will be described in detail hereinafter with reference to the accompanying drawing in which.

Figure 1:
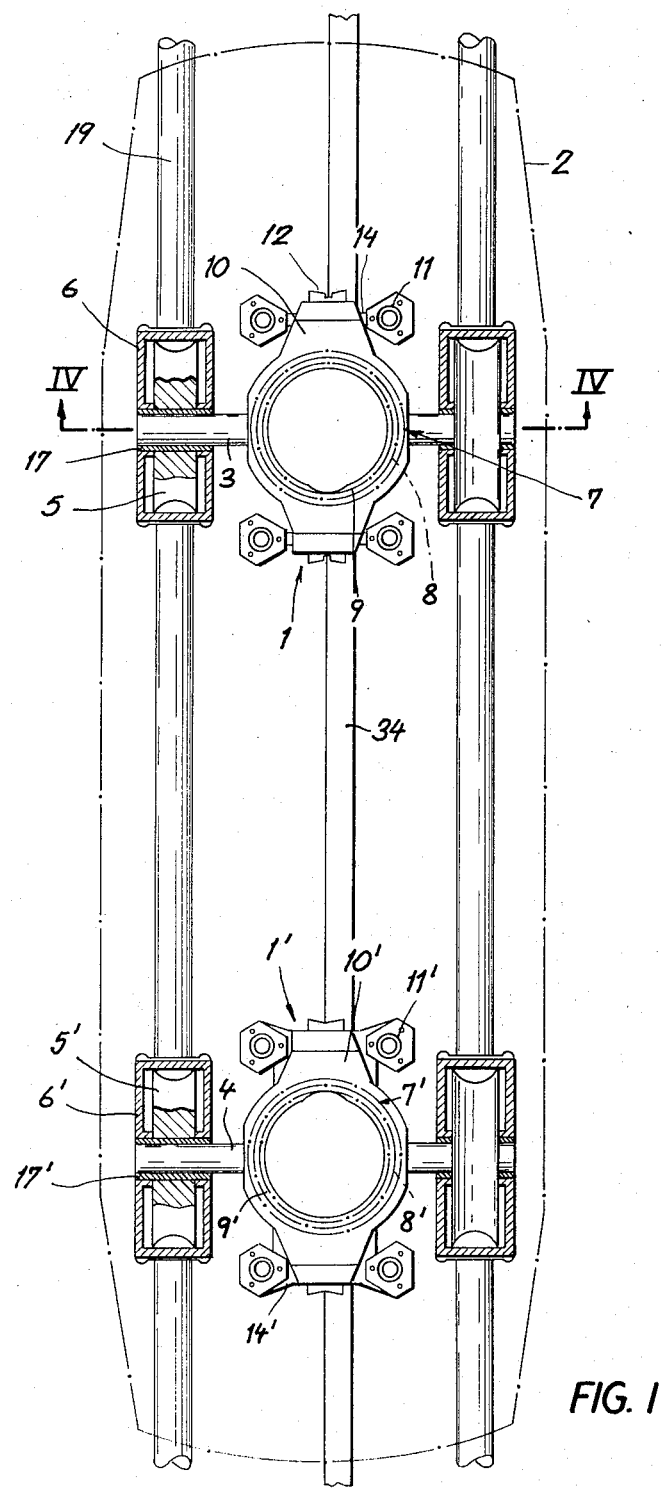
FIG. 1 is a top plan view of the chassis of a vehicle embodying my invention.

In FIG. 1 I have shown at 2 the outline of the body of a vehicle of a roller coaster, e.g., of the general type described in my prior U.S. Pat. No. 3,631,805, guided on a track which is constituted by a pair of rails 19. The vehicle has a chassis consisting of a front and a rear wheel base 1, 1' supporting respective axles 3 and 4. The two bases being substantially identical, with exceptions noted hereinafter, only the front base 1 needs to be described in detail; corresponding elements of the rear base 1' have been designated by the same reference numerals supplemented by a prime mark.

Figure 4:
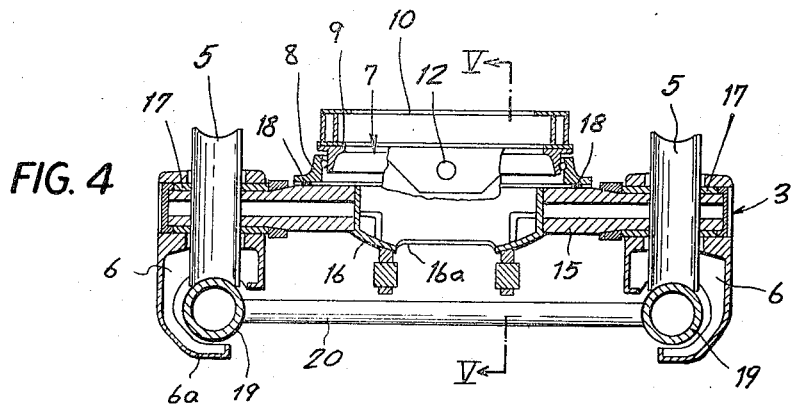
FIG. 4 is a cross-sectional view taken on the line IV — IV of FIG. 3.
Figure 5:
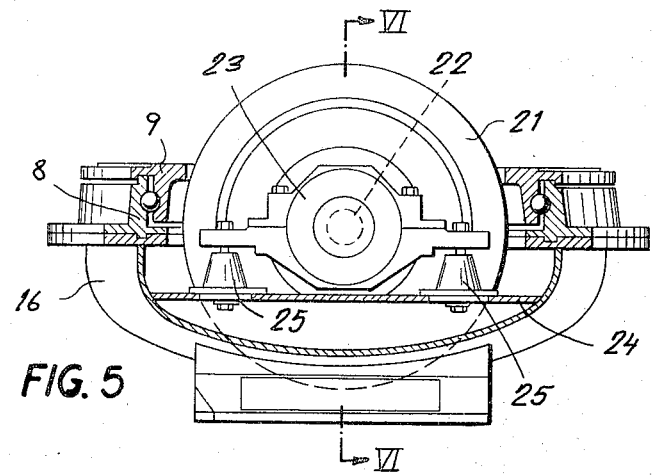
FIG. 5 is a cross-sectional view (drawn to a larger scale) taken on the line V — V of FIG. 4, showing a traction wheel omitted in FIGS. 1 - 4.

Axle 3 supports a pair of freely rotatable wheels 5 with a periphery shaped to conform to the rails 19 which, as best seen in FIG. 4, consist of a pair of pipes interconnected by transverse or diagonal ties 20.

Axle 3 is split into two tubular stubs 15 each having a wheel 5 journaled thereon by a sleeve bearing 17. Each wheel 5 is enclosed in a housing 6 with a downward extension 6a underlying the adjoining rail 19 to prevent the vehicle from being lifted off the track, as more fully described in my above-identified U.S. Pat. No. 3,631,805.

Figure 6:
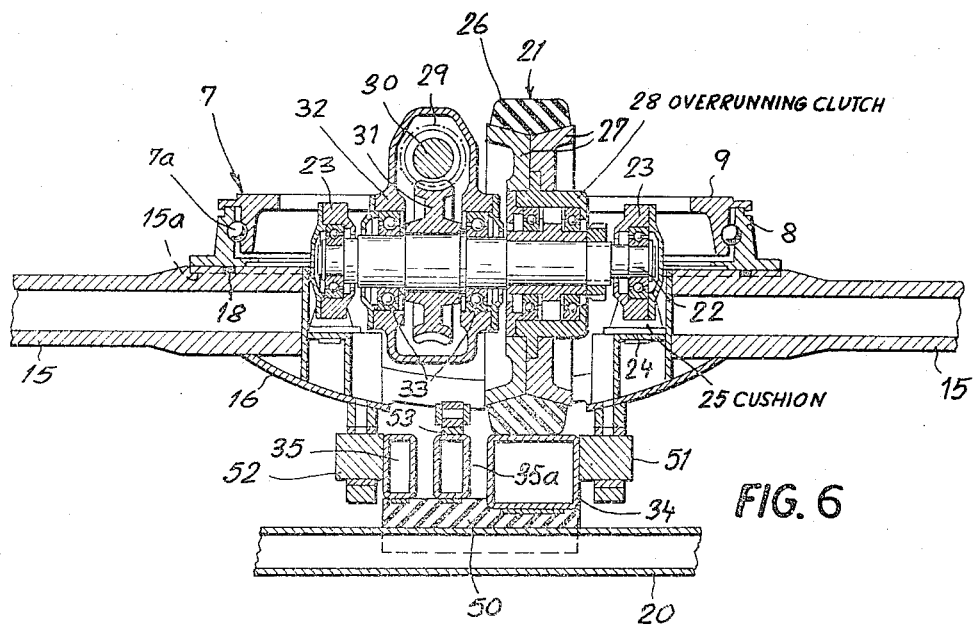
FIG. 6 is a cross sectional view taken on the line VI — VI if FIG. 5.

Tubular stubs 15 are interconnected at the bottom by a downwardly convex axle housing 16 having a central cutout 16a. The stubs 15 are upwardly flattened at 15a (FIG. 6) to form a seat for a ring 8 of a swivel mounting 7, ring 8 being welded or, preferably, bolted to that seat at 18. Swivel mounting 7 includes another ring 9 which is coaxially held in ring 8 and rotatably engages same through a set of balls 7a received in races formed by these rings.

Figure 2:
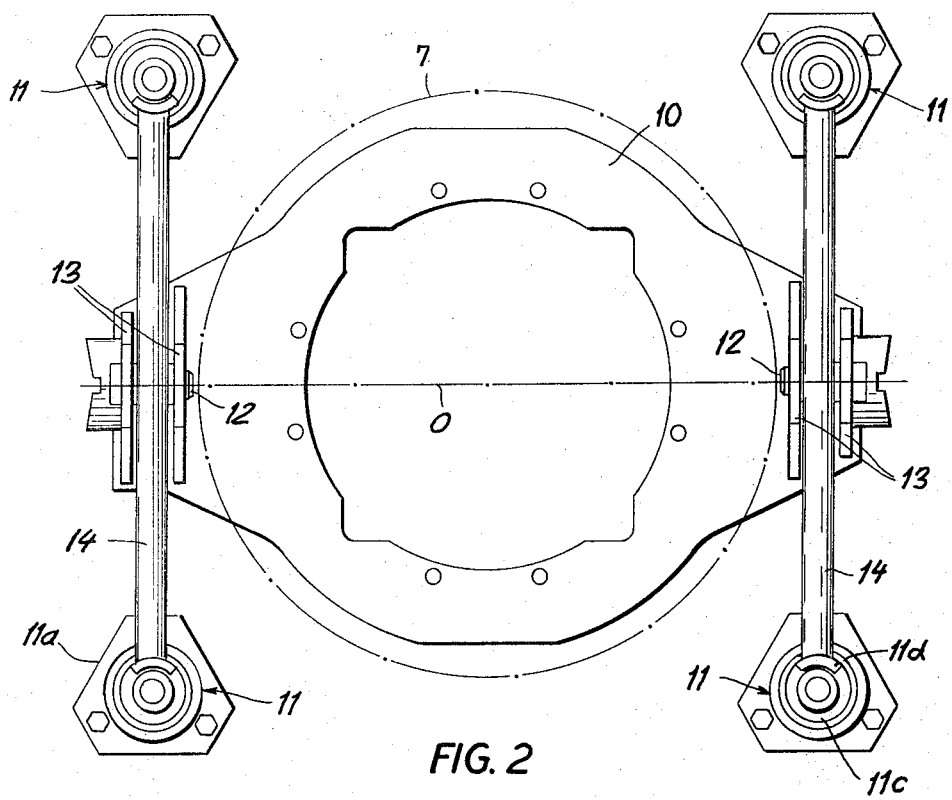
FIG. 2 is a bottom view of the front wheel base of that chassis drawn to a larger scale.
Figure 3:
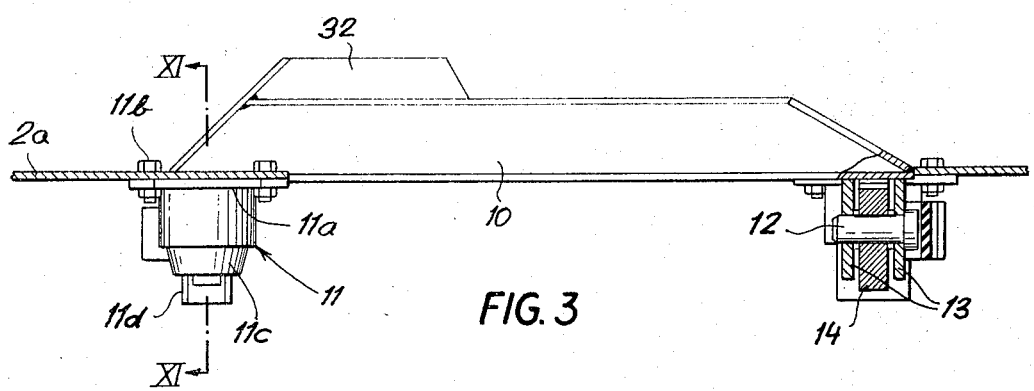
FIG. 3 is a front view of the wheel base shown in FIG. 2.

Ring 9 is integral with a bearing plate 10 which is secured to vehicle body 2 through four shock absorbers 11 (FIGS. 1 – 3) whose generally triangular bases 11a are fastened by bolts 11b to a bottom plate 2a of body 2. The shock absorbers 11 have plungers 11c with extensions 11d welded to respective ends of a pair of outrigger arms 14. In the case of the front wheel base 1, these arms are pivotable about pins 12 traversing respective bifurcations 13 at the forward and rearward extremities of bearing plate 10, the pins 12 registering with a central longitudinal axis O extending in the direction of travel. In contradistinction thereto, the corresponding arms 14' (FIG. 1) of rear wheel base 1' may be fixedly secured to bearing plate 10'. The swingable mounting of arms 14 enables a relative sluing of front and rear axles 3 and 4 by an angle of, say, up to 13°.

Figure 11:
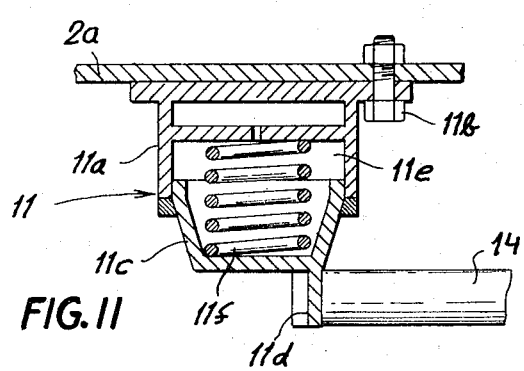
FIG. 11 is a cross-sectional view taken on the line XI — XI of FIG. 3.

The construction of shock absorber 11 is similar to that used in conventional automotive wheel suspensions and, as shown in FIG. 11, includes a dashpot 11e in tandem with resilient means here represented by a spring 11f; an air cushion may be used with the dashpot instead of the spring. Such a shock absorber provides an elastic mechanical connection which not only softens impacts but also damps vibrations.

Axle housing 16 is internally reinforced by ribs or brackets forming a pair of shelves 24 on opposite sides of cutout 16a, these shelves supporting bearings 23 for a power shaft 22 which parallels the axle stubs 15 and supports a traction wheel 21. This wheel consists essentially of two interconnected halves 27 embraced by a felly 26 of elastic material, e.g., synthetic rubber, the wheel body 27 being coupled with the shaft 22 through the intermediary of an overrunning clutch 28. Owing to the interposition of this clutch, wheel 21 may freely rotate on the stationary or slowly turning shaft 22 in one direction, i.e., the direction of its frictional entrainment by a stationary track member 34 extending between the rails 19 along a rising section of the vehicle path; track member 34 is supported on ties 20 through a resilient pad 50 for engagement with the felly 26. Bearings 23 are also resiliently supported on the shelves 24 by way of elastic cushions 25.

A pair of guide shoes 51, 52 rigidly suspended from axle housing 16 bear laterally upon track member 34 and a similar member 35 also carried on pad 50. Another such member 35a constitutes an electric bus bar which is contacted by a brush 53 forming part of an energizing circuit for a drive motor 38 seen in FIGS. 8 and 9. The ground return of this circuit may extend via shoes 51 and/or 52 through bars 34 and/or 35.

Figure 8:
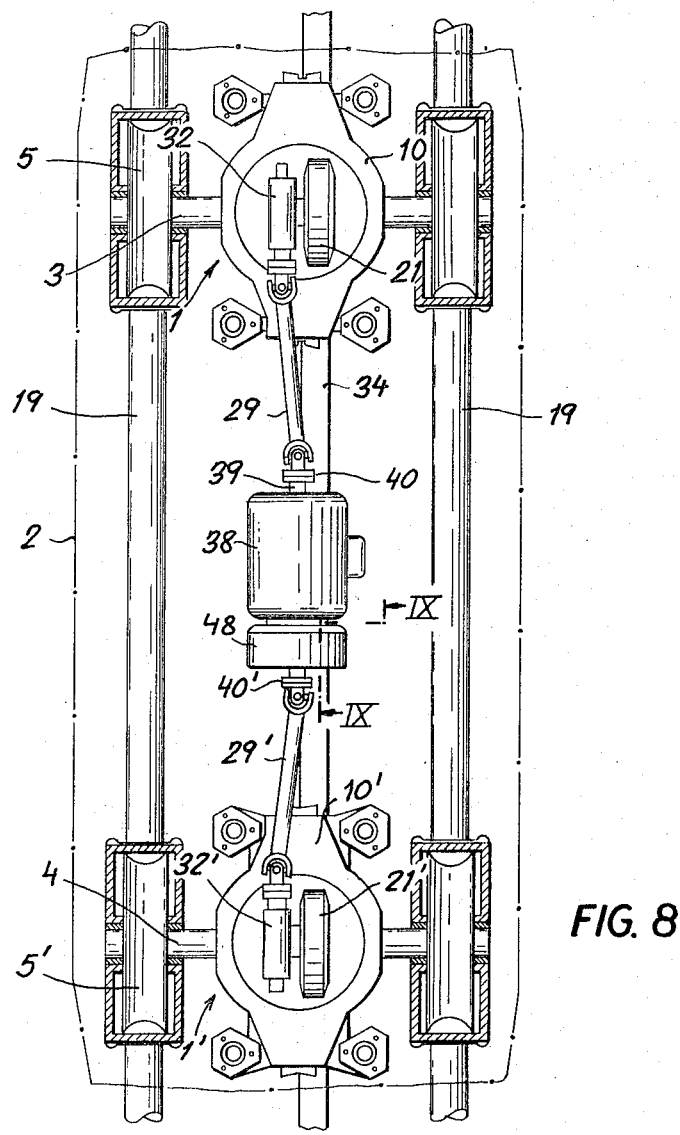
FIG. 8 is a top plan view similar to FIG. 1 but showing driving means for a pair of traction wheels as illustrated in FIGS. 5 - 7.
Figure 9:
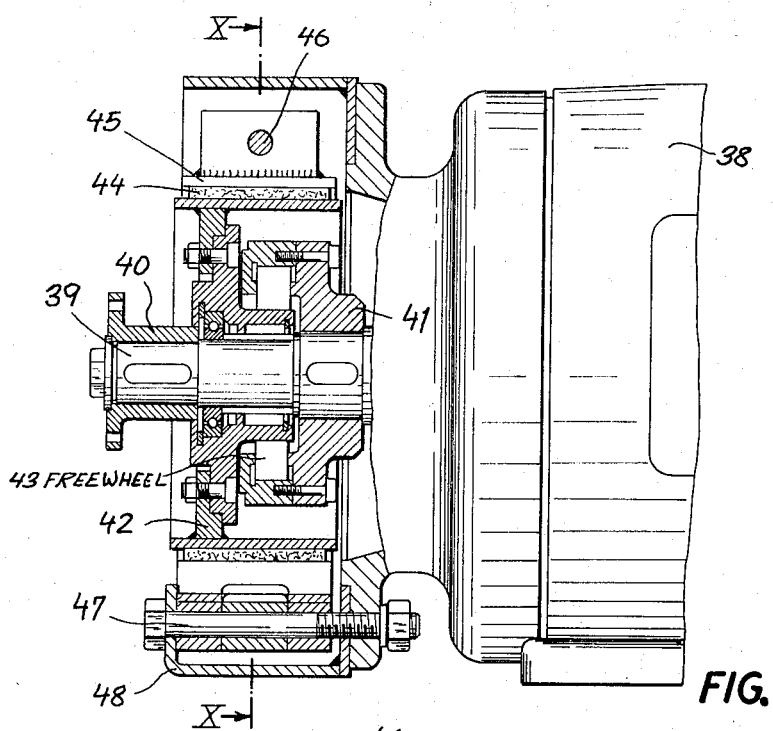
FIG. 9 is an enlarged side-elevational view, partly in section, taken on the line IX — IX of FIG. 8.
Figure 10:
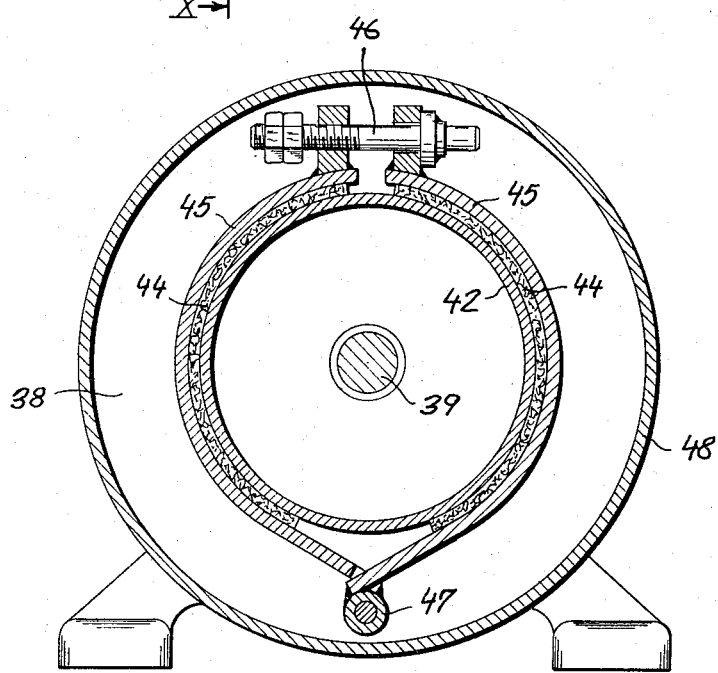
FIG. 10 is a cross-sectional view taken on the line IX — IX of FIG. 9.

As shown in FIG. 8, motor 38 is coupled with traction wheels 21 and 21' of wheel bases 1 and 1' through a pair of flexible transmissions 29 and 29' each comprising a shaft provided with a universal joint at either end. Transmission 29 further includes a worm 30 (FIG. 6) journaled in a gear housing 32, this worm meshing with a worm gear 31 keyed to shaft 22. Gear housing 32 is supported on shaft 22 by way of journal bearings 33 and is held against rotation by means of a T-shaped extension 36 whose web is inserted from above between two upstanding strips 37 rigid with axle housing 16; elements 36 and 37 are detachably interconnected by screws not shown.

The stator of motor 38 is integral with a brake housing 48 which is thus rigidly secured to vehicle body 42. Motor 38 has an output shaft 39 terminating in a pair of flanges 40, 40' bolted onto the adjacent universal joints of transmissions 29, 29', respectively. A hub 41 keyed to shaft 39 is coupled with a coaxial but stationary hub 42 through a freewheel 43. Hub 42 is normally immobilized by a pair of arcuate clamp jaws 45 engaging respective brake linings 44 on this hub; the jaws are pivotable about a bolt 47 and are interconnected by a clamping screw 46.

If the vehicle diagrammatically shown in FIG. 8 should become stalled on an upgrade, owing to failure of the power supply or inadequate contact between brushes 53 and conductor 35, freewheel 43 operates to prevent any reverse rotation of motor shaft 39 and the transmissions 29, 29' coupled therewith. A manual loosening of the clamp 45, 46 thereupon allows a controlled backsliding of the vehicle or vehicles in order to give access to the defective portion of the bus bar or to allow the passengers to disembark. After the defect has been remedied and the clamp has been retightened for the sake of safety, travel may be resumed by the energization of drive motor 38.

The system described and illustrated overcomes, by the combination of the various features disclosed, a number of problems hitherto encountered in amusement devices of this nature. It is to be understood, however, that these features may be modified in a number of ways and that some of them could be used independently. Thus, for example, the vehicle-borne drive motor 38 with its unidirectional coupling means 28 and 43 may be employed without the shock absorbers 11, 11' and swivel mountings 7, 7', and/or vice versa.

Figure 7:
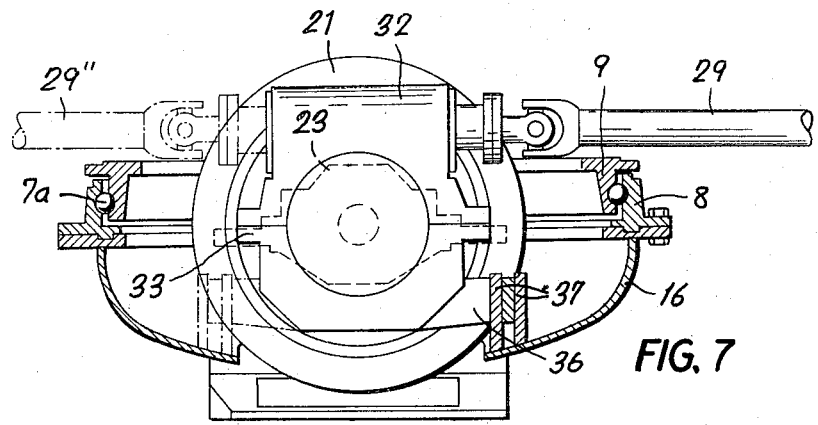
FIG. 7 is a view (partly in section) of the assembly of FIG. 5 as seen from the opposite side.

As illustrated at 29" in FIG. 7, linkages similar to those shown at 29, 29' may be extended from an axle housing of one vehicle to an axle housing of an adjoining vehicle for transmitting the driving torque of a common motor 38 to the traction wheel thereof.

I claim:

1. A vehicle for a roller coaster provided with a pair of rails forming a guidetrack, comprising:
   a vehicular body;
   a front axle and a rear axle each provided with a pair of rail-engaging wheels;
   an individual bearing plate for each axle provided with two outrigger arms pivotally connected thereto forwardly and rearwardly of the respective axle and generally paralleling same;
   a pair of shock absorbers carried on opposite ends of each outrigger arm inwardly of said rail-engaging wheels for yieldably anchoring each bearing plate to said body to facilitate relative universal movement therebetween, each of said shock absorbers including a dashpot and resilient means in combination therewith; and
   a swivel mounting linking each axle with the respective bearing plate for enabling each axle to rotate freely about a vertical axis with reference to said body.

2. A vehicle as defined in claim 1 wherein the outrigger arms of the bearing plate associated with the front axle are pivotally mounted thereon for swinging about a central longitudinal axis with reference thereto.

3. A vehicle as defined in claim 1 wherein said swivel mounting comprises a first ring rigid with the respective axle, a second ring rigid with said bearing plate coaxially engaging said first ring, and antifriction means inserted between said rings.

4. A vehicle as defined in claim 3 wherein said rings form a pair of ball races, said antifriction means comprising a set of balls received in said races.

5. A vehicle as defined in claim 3, further comprising an axle housing rigid with said first ring, each axle including a pair of spaced-apart stubs interconnected at the bottom by said axle housing and at the top by said first ring, each of said stubs supporting one of the wheels of the associated pair.

6. A vehicle as defined in claim 5, further comprising a traction wheel between said stubs passing through a cutout in said axle housing for frictional engagement with a track member paralleling said rails along at least part of said guidetrack, drive means for said traction wheel on said body, and transmission means linking said drive means with said traction wheel.

7. A vehicle as defined in claim 6 wherein said drive means comprises an electric motor, further comprising contact means on said axle housing conductively connected with said motor and positioned for engagement with conductor means extending alongside said track member.

8. A vehicle as defined in claim 6 wherein said transmission means comprises a power shaft journaled on said axle housing and extending parallel to said stubs, gear means supported by said power shaft, and flexible link means coupling said drive means with said gear means.

9. A vehicle as defined in claim 8 wherein said gear means is provided with a support anchored directly to said axle housing.

10. A vehicle as defined in claim 8 wherein said power shaft is provided with bearing means resiliently suppported on said axle housing.

11. A vehicle as defined in claim 8 wherein said transmission means further includes an overrunning clutch between said power shaft and said traction wheel enabling the vehicle to coast with said traction wheel rotating faster than said power shaft.

12. A vehicle as defined in claim 8, further comprising releasable brake means on said body and a unidirectional coupling between said brake means and said drive means preventing reverse rotation of the latter.

13. A vehicle for a roller coaster provided with a pair of rails forming a guidetrack, comprising:
   a vehicular body;
   a front axle and a rear axle each provided with a pair of wheels riding said rails, at least one of said axles being constituted by a pair of spaced-apart stubs respectively supporting the wheels of the associated pair;
   mounting means securing each of said axles to said body, said mounting means including an axle housing rigidly interconnecting said stubs, a bearing member, swivel means supporting said bearing member on said axle housing with freedom of relative rotation about a vertical axis, a pair of outrigger arms pivotally connected to said bearing member forwardly and rearwardly of said one of said axles and generally paralleling same, and a pair of shock absorbers carried on opposite ends of each outrigger arm for yieldably anchoring said bearing member to said body, each of said shock absorber including a dashpot and resilient means in combination therewith;
   a traction wheel between said stubs passing through a clearance in said axle housing for frictional engagement with a track member paralleling said rails along at least part of said guidetrack, said traction wheel being provided with a power shaft disposed parallel to said stubs and journaled in said housing, said traction wheel extending downwardly through a cutout in said axle housing;
   drive means for said traction wheel on said body; and
   transmission means linking said drive means with said power shaft, said transmission means being at least partly supported on said axle housing.

14. A vehicle as defined in claim 13 wherein said transmission means includes an overrunning clutch between said power shaft and said traction wheel enabling the latter to rotate freely at a higher speed than said power shaft.

15. A vehicle as defined in claim 14, further comprising stationary brake means on said body and a unidirectional coupling between said brake means and said drive means preventing reverse rotation of the latter.

16. A vehicle as defined in claim 15 wherein said brake means is controlledly releasable for enabling backward motion of the vehicle in the inactive condition of said drive means.

* * * * *